(12) United States Patent
Nakamura (10) Patent No.: US 11,199,757 B2
(45) Date of Patent: Dec. 14, 2021

(54) IMAGING DEVICE (71) Applicant: Nidec Copal Corporation, Tokyo (JP)

(72) Inventor: Yuta Nakamura, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/958,135

(22) PCT Filed: Nov. 29, 2018

(86) PCT No.: PCT/JP2018/043968
§ 371 (c)(1),
(2) Date: Jun. 25, 2020

(87) PCT Pub. No.: WO2019/130969
PCT Pub. Date: Jul. 4, 2019

(65) Prior Publication Data
US 2020/0363702 A1    Nov. 19, 2020

(30) Foreign Application Priority Data

Dec. 27, 2017 (JP) .............................. JP2017-251308

(51) Int. Cl.
*G03B 17/08*      (2021.01)
*H04N 5/225*      (2006.01)
(Continued)

(52) U.S. Cl.
CPC ............. *G03B 17/08* (2013.01); *G03B 17/12* (2013.01); *G03B 17/56* (2013.01); *G03B 30/00* (2021.01); *H04N 5/2252* (2013.01)

(58) Field of Classification Search
None
See application file for complete search history.

(56) References Cited

U.S. PATENT DOCUMENTS 6,296,336 B1 *  10/2001 Hattori .................. H05K 5/061
                                                                     220/378
6,995,462 B2 *   2/2006 Bolken .................. H01L 21/50
                                                                     257/680
(Continued)

FOREIGN PATENT DOCUMENTS

JP        201078772 A      4/2010
JP       2010078772 A  *   4/2010
(Continued)

OTHER PUBLICATIONS

International Search Report in PCT/JP2018/043968, dated Mar. 5, 2019. 2pp.

*Primary Examiner* — Clayton E. LaBalle
*Assistant Examiner* — Leon W Rhodes, Jr.
(74) *Attorney, Agent, or Firm* — Hauptman Ham, LLP (57) ABSTRACT

An imaging device includes a first case, a second case joined to the first case, a substrate receiving an electronic component accommodated in an internal space defined by the first and second cases, a lens barrel holding a lens and supported by the first or second case, and a waterproof seal held in a waterproof-seal holding space between the first and second cases. The first case has a first surface substantially perpendicular to an optical axis, a second surface substantially parallel to the optical axis, and an inner surface meeting the first surface and extending in the optical axis direction. The first and second surfaces form the waterproof-seal holding space. The inner surface faces the substrate edge. The second case has a third surface substantially perpendicular to the optical axis and a fourth surface substantially parallel to the optical axis. The third and fourth surfaces form the waterproof-seal holding space.

20 Claims, 9 Drawing Sheets

(51) Int. Cl.
*G03B 30/00* (2021.01)
*G03B 17/12* (2021.01)
*G03B 17/56* (2021.01)

(56) References Cited

U.S. PATENT DOCUMENTS

| | | | |
|---|---|---|---|
| 8,420,937 B2* | 4/2013 | Hsu | H05K 5/063 |
| | | | 174/91 |
| 8,482,665 B2* | 7/2013 | Jeon | H04N 5/2257 |
| | | | 348/374 |
| 2011/0199485 A1 | 8/2011 | Nakamura | |
| 2017/0129418 A1 | 5/2017 | Koshiba et al. | |

FOREIGN PATENT DOCUMENTS

| | | |
|---|---|---|
| JP | 201146331 A | 3/2011 |
| JP | 2011164461 A | 8/2011 |
| JP | 2012183925 A | 9/2012 |
| WO | 2010087270 A1 | 8/2010 |
| WO | 2015198598 A1 | 12/2015 |

\* cited by examiner

IMAGING DEVICE

RELATED APPLICATIONS

The present application is National Phase of International Application Number PCT/JP2018/043968, filed Nov. 29, 2018, and claims priority based on Japanese Patent Application No. 2017-251308, filed Dec. 27, 2017.

FIELD

An embodiment of the present invention relates to, for example, an imaging device.

BACKGROUND

Known imaging devices may include a case accommodating a lens barrel holding a lens and a substrate on which an image sensor is mounted. Such imaging devices are increasingly used in automobiles and may have a waterproof seal placed between a front case and a rear case included in the case to achieve higher waterproofness. For example, Patent Literatures 1 to 3 describe such waterproof camera (imaging device) structures.

CITATION LIST

Patent Literature

Patent Literature 1: Japanese Unexamined Patent Application Publication No. 2012-183925
Patent Literature 2: Japanese Unexamined Patent Application Publication No. 2011-164461
Patent Literature 3: Japanese Unexamined Patent Application Publication No. 2011-046331

BRIEF SUMMARY

Technical Problem

Such waterproof imaging devices tend to be smaller nowadays but are limited by the known structures.

Solution to Problem

In response to the above issue, one or more aspects of the present invention are directed to the structures described below. The reference numerals or other labels in parentheses herein denote the corresponding components in the figures to facilitate understanding of the aspects of the present invention. However, the components with such reference numerals do not limit the components according to the aspects of the present invention, which should be construed broadly within the scope technically understandable by those skilled in the art.

An imaging device according to one aspect of the present invention includes a first case (3, 31 or 7, 71), a second case (7, 71 or 3, 31) joined to the first case, a substrate (51, 52) on which an electronic component is mounted, and accommodated in an internal space defined by the first case and the second case, a lens barrel (1) holding a lens and supported by the first case or the second case, and a waterproof seal (4) held in a waterproof-seal holding space between the first case and the second case. The first case has a first surface (3d, 71d) substantially perpendicular to an optical axis, a second surface (3c, 71c) substantially parallel to the optical axis, and an inner surface (3e, 71e) meeting the first surface and extending in a direction of the optical axis. The first surface and the second surface form the waterproof-seal holding space. The inner surface faces an edge of the substrate. The second case has a third surface (7d, 31d) substantially perpendicular to the optical axis and a fourth surface (7e, 31e) substantially parallel to the optical axis. The third surface and the fourth surface form the waterproof-seal holding space.

An imaging device according to another aspect of the present invention includes a first case (3, 31, 32 or 7, 71, 72), a second case (7, 71, 72 or 3, 31, 32) joined to the first case, a substrate (51, 52) on which an electronic component is mounted, and accommodated in an internal space defined by the first case and the second case, a lens barrel (1) holding a lens and supported by the first case or the second case, and a waterproof seal (4) held in a waterproof-seal holding space between the first case and the second case. The first case has a first surface (32c, 3d, 71d) including a portion substantially perpendicular to an optical axis and an inner surface (32d, 3e, 71e) extending in a direction of the optical axis from the first surface. The first surface forms the waterproof-seal holding space. The inner surface faces an edge of the substrate. The second case has a third surface (72d, 7d, 31d) including a portion substantially perpendicular to the optical axis. The third surface forms the waterproof-seal holding space.

The imaging device according to any of the above aspects includes the case with the inner surface, facing the substrate, located more outward than in known structures. Thus, the case having the same size as in known structures can provide a relatively large space for accommodating the substrate. The imaging device including the substrate having the same size as in known structures can be relatively small.

In the above imaging device, the first case may be located frontward from the second case in the optical axis direction, and the lens barrel may be supported by the first case.

In the imaging device with the above structure, the front case (first case) located frontward in the optical axis direction supports the lens barrel. This structure provides a relatively large internal space in the front case for accommodating the substrate.

In the above imaging device, the first case may be located rearward from the second case in the optical axis direction, and the lens barrel may be supported by the second case.

In the imaging device with the above structure, the front case (second case) located frontward in the optical axis direction supports the lens barrel. This structure provides a relatively large internal space in the rear case (first case) for accommodating the substrate.

In the above imaging device, the substrate may receive an image sensor.

The imaging device with the above structure can be relatively small and provide a relatively large space for accommodating the substrate on which an image sensor is mounted.

The above imaging device may further include an image sensor substrate on which an image sensor is mounted, and accommodated in the internal space.

In the above imaging device, the inner surface may face an edge of the image sensor substrate.

The imaging device with the above structure includes multiple substrates. Such an imaging device can be relatively small and provide a relatively large space for accommodating the multiple substrates.

DETAILED DESCRIPTION

An imaging device according to one or more embodiments of the present invention includes, among other features, a front case and a rear case joined together for accommodating a substrate, and a waterproof seal held, between the front case and the rear case, in a space that allows the inner surface of the front case (or the rear case) to be more outward than in known structures. Specific examples of the structure according to the embodiments of the present invention will now be described. The embodiments described below are mere examples of the present invention, and should not be construed as limiting the technical scope of the invention. In the figures, similar components are indicated by like reference numerals and may not be described.

1. Embodiments
2. Modifications
3. Features
4. Supplemental Examples

An optical axis herein refers to an axis passing through the center of a lens incorporated in the imaging device and also an axis extending along the center of light entering the image sensor. A subject herein refers to an imaging target located opposite to the image sensor from the lens. The subject as viewed from the image sensor is located in the direction herein referred to as frontward in the optical axis direction, front, or facing the subject, whereas the image sensor as viewed from the subject is located in the direction herein referred to as rearward in the optical axis direction, rear, or facing the image sensor.

1. EMBODIMENTS

Figure 1:
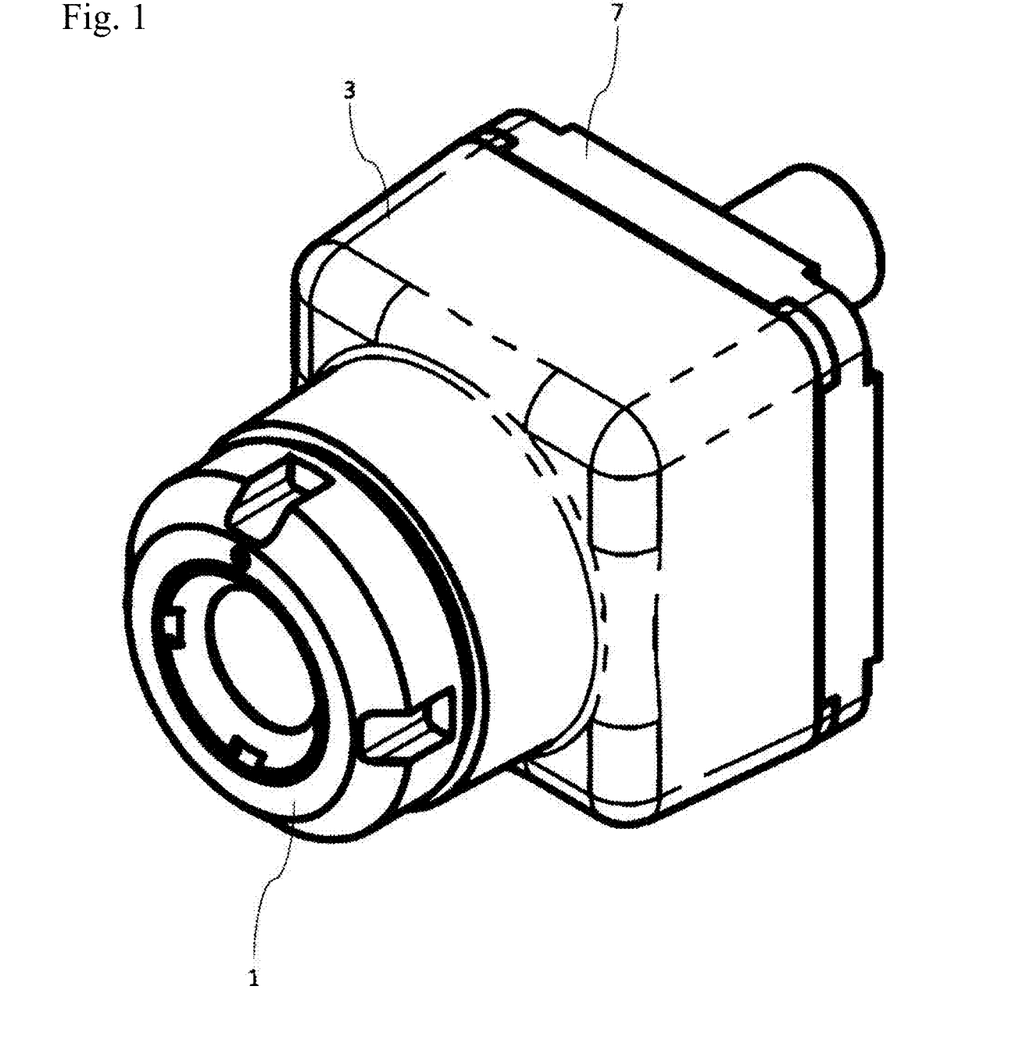
FIG. 1 is an external front perspective view of an imaging device.
Figure 2:
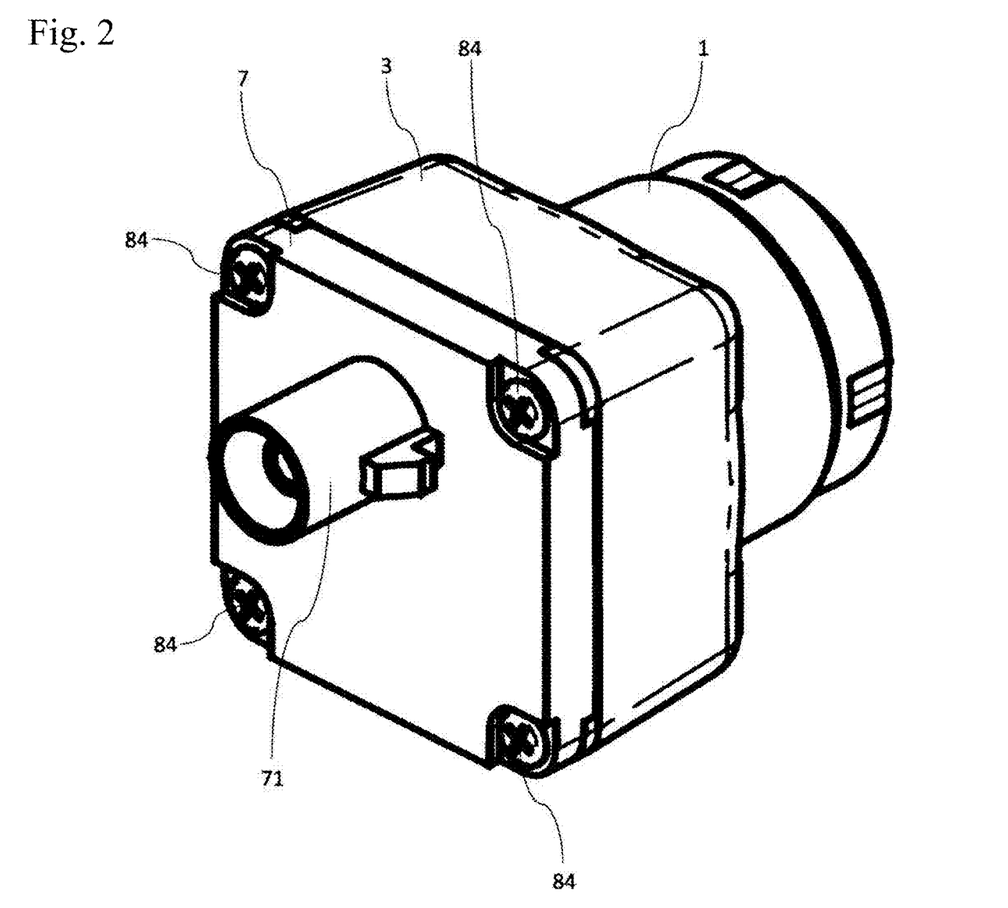
FIG. 2 is an external rear perspective view of the imaging device.
Figure 3:
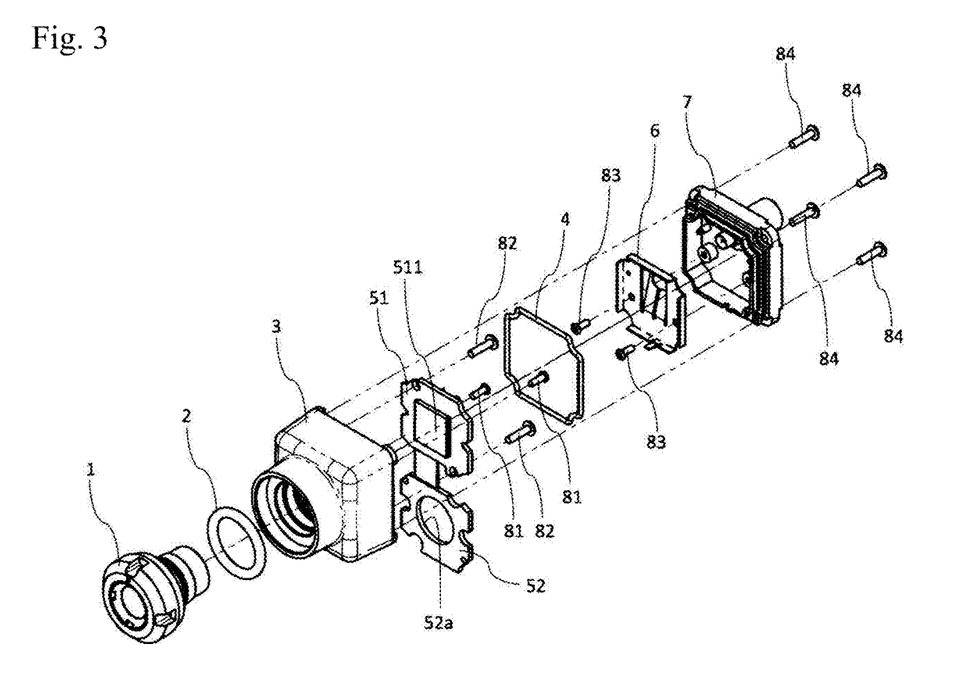
FIG. 3 is an exploded front perspective view of the imaging device.
Figure 4:
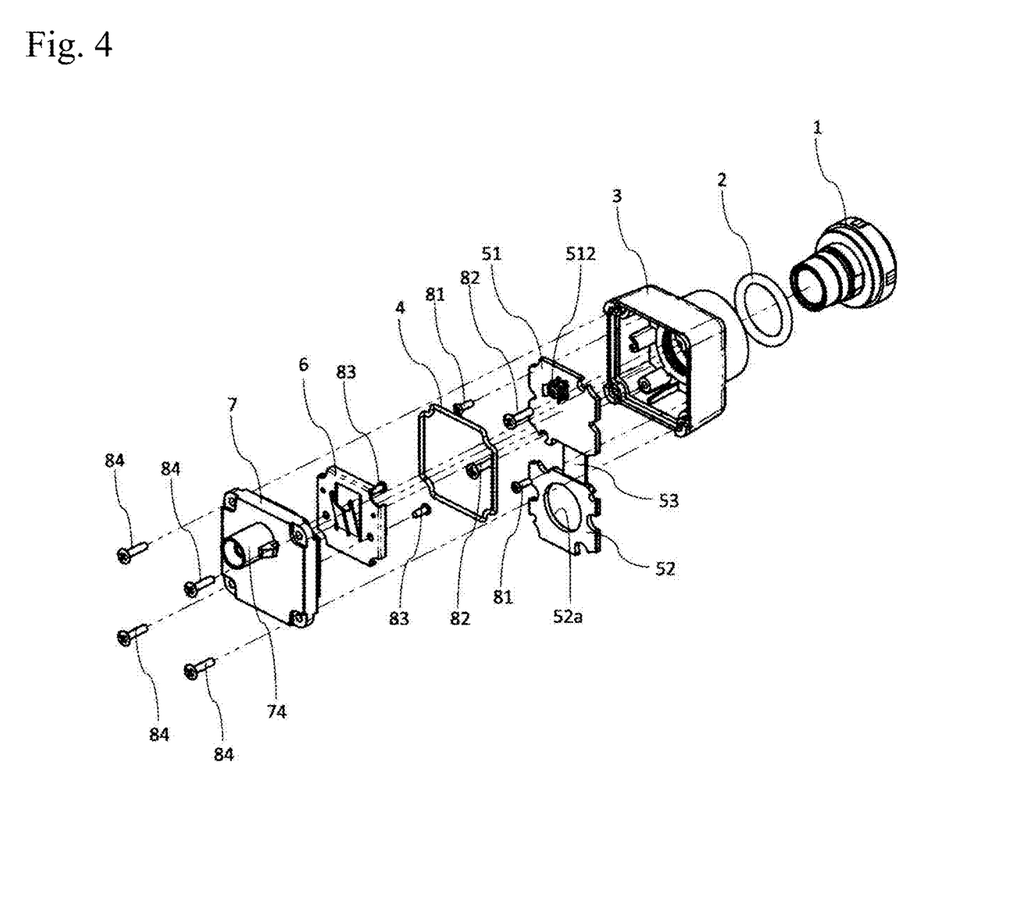
FIG. 4 is an exploded rear perspective view of the imaging device.
Figure 5:
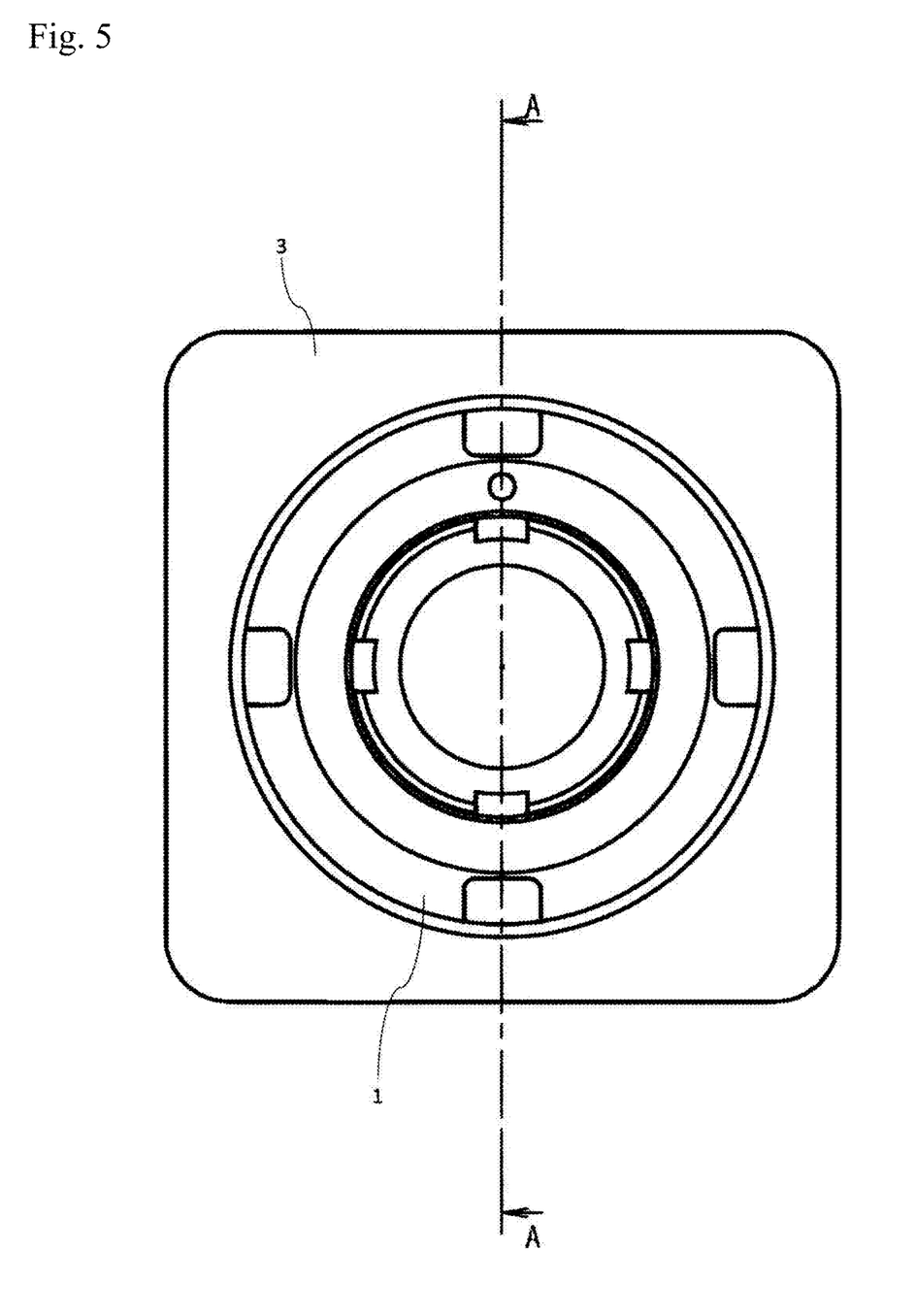
FIG. 5 is a front plan view of the imaging device.
Figure 6:
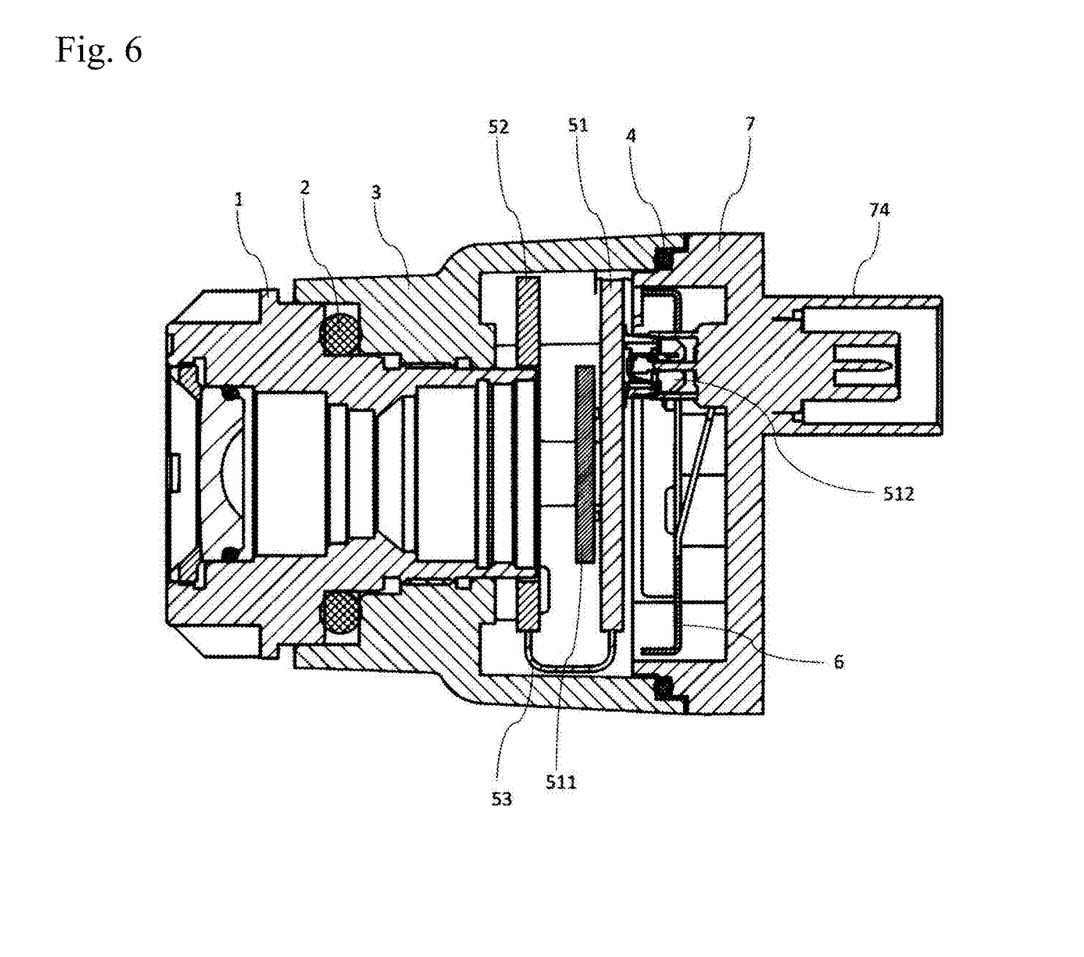
FIG. 6 is a cross-sectional view of the imaging device.

An embodiment of the present invention will now be described with reference to FIGS. 1 to 7. FIG. 1 is an external front view of an imaging device. FIG. 2 is an external rear view of the imaging device. FIG. 3 is an exploded front perspective view of the imaging device. FIG. 4 is an exploded rear perspective view of the imaging device. FIG. 5 is a front plan view of the imaging device. FIG. 6 is a cross-sectional view taken along line A-A in FIG. 5.

As illustrated, the imaging device according to the present embodiment includes a lens barrel 1, a waterproof seal 2, a front case 3, a waterproof seal 4, a first substrate 51, a second substrate 52, a shield plate 6, and a rear case 7. One feature of the present embodiment lies in a portion near a waterproof-seal holding space for holding the waterproof seal 4.

Front Case 3

The front case 3, together with the rear case 7, forms a housing (case) of the imaging device. The front case 3 is formed from, for example, metal or resin. The front case 3 has an opening facing frontward in the optical axis direction and having the center at the optical axis. The front case 3 has an open portion facing rearward in the optical axis direction to allow joining to the rear case 7. The rear open portion has substantially rectangular peripheral surfaces around the optical axis. The front case 3 is joined to the rear case 7 to define an internal space for accommodating the lens barrel 1, the first substrate 51, the second substrate 52, the shield plate 6, and other components. As described in detail later, the joint between the front case 3 and the rear case 7 has a waterproof-seal holding space for holding the waterproof seal 4. As shown in FIG. 1, the front case 3 holds the lens barrel 1 in its opening facing frontward in the optical axis direction. The waterproof seal 2 is placed between the front case 3 and the lens barrel 1.

Rear Case 7

The rear case 7, together with the front case 3, forms the housing (case) of the imaging device. Similarly to the front case 3, the rear case 7 is formed from, for example, metal or resin. The rear case 7 is located rearward from the front case 3 in the optical axis direction. As described above, the rear case 7 is joined to the front case 3 to define the internal space for accommodating the lens barrel 1, the first substrate 51, the second substrate 52, the shield plate 6, and other components. The rear case 7 has a front portion in the optical axis direction with substantially the same shape as the rear portion of the front case 3 in the optical axis direction. When assembled, the rear case 7 is joined to the front case 3 with fasteners 84.

The rear case 7 includes, rearward in the optical axis direction, a connector unit 74 for connecting a connector 512 on the first substrate 51 to an external device. The connector unit 74 accommodates electric wires and other components for transmitting signals. The connector unit 74 is a cylinder protruding rearward in the optical axis direction.

Lens Barrel 1

The lens barrel 1 is a cylinder elongated along the optical axis and holds one or more optical members including a lens. The lens barrel 1 may hold optical members including a spacer, aperture blades, and an optical filter, in addition to one or more lenses. The lenses are formed from a transparent material, such as glass or plastic, to transmit light from the front to the rear in the optical axis direction while refracting the light. The spacer is an annular plate with an appropriate thickness in the optical axis direction. The spacer adjusts the positions of the lenses in the optical axis direction. The spacer has an opening in its center part through which the optical axis extends. The aperture blades determine the outermost position of passing light. The optical filter reduces or blocks light with predetermined wavelengths. The optical filter may include, for example, an infrared cut-off filter that reduces passage of infrared light. The numbers and types of optical members used can be changed as appropriate.

Waterproof Seal 2

The waterproof seal 2 is annular and is formed from an elastic material, such as rubber. The waterproof seal 2 is placed between the front case 3 and the lens barrel 1 to join the front case 3 and the lens barrel 1 together with no gap between them. The waterproof seal 2 reduces water, dust, and other matter entering the internal space. The waterproof seal 2 is annular in conformance with the outer rim of the opening of the front case 3.

Waterproof Seal 4

The waterproof seal 4 is rectangular and is formed from an elastic material, such as rubber. The waterproof seal 4 is held in the waterproof-seal holding space between the front case 3 and the rear case 7. The waterproof seal 4 joins the front case 3 and the rear case 7 together with no gap between them. The waterproof seal 4 reduces water, dust, and other matter entering the internal space. The waterproof seal 4 according to the present embodiment is rectangular in conformance with the open rectangular rear part of the front case 3 and with the open rectangular front part of the rear case 7 in the optical axis direction. The waterproof seal 4 may be shaped differently in conformance with the shapes of the front case 3 and the rear case 7.

First Substrate 51

The first substrate 51 is a rigid substrate on which an image sensor 511 is mounted. The first substrate 51 may receive an electronic component other than the image sensor 511. The first substrate 51 has a rear surface in the optical axis direction on which a connector 512 is mounted. The first substrate 51 has a front surface in the optical axis direction on which the image sensor 511 is mounted. The first substrate 51 extends along a plane perpendicular to the optical axis to allow light to enter the image sensor 511 during image capturing. The image sensor 511 receives light passing through the lens and other components held in the lens barrel 1 and an opening 52a in the second substrate 52. Electrical signals obtained by the image sensor 511 undergo predetermined electric or signal processing performed by the electronic components on the first substrate 51 and on the second substrate 52. The processed signals are then output, as image data, from the connector 512 through the connector unit 74 in the rear case 7 to a device external to the imaging device. The first substrate 51 is joined to the front case 3 and fixed with multiple fasteners 82.

Image Sensor 511

The image sensor 511 is a photoelectric converter that converts incident light to electric signals. The image sensor 511 is, for example, a complementary metal-oxide semiconductor (CMOS) sensor or a charge-coupled device (CCD), but is not limited to such devices. The image sensor 511 receives light passing through the opening 52a in the second substrate 52. The imaging device may include an imaging unit having the imaging function other than the image sensor 511.

Second Substrate 52

The second substrate 52 is a rigid substrate on which an electronic component is mounted. Similarly to the first substrate 51, the second substrate 52 extends along a plane perpendicular to the optical axis. In other words, the first substrate 51 and the second substrate 52 are parallel to each other. The second substrate 52 is located frontward from the first substrate 51 in the optical axis direction. In other words, the second substrate 52 is placed between the first substrate 51 and the lens barrel 1. The second substrate 52 is joined to the front case 3 and fixed with multiple fasteners 81.

The second substrate 52 has the opening 52a, which is a circular through-hole having the center at the optical axis. Light passing through the lens and other components in the lens barrel 1 passes through the opening 52a. The opening 52a has an edge that allows passage of a portion of light corresponding to an effective imaging region to form an image in the image sensor 511. Light not used to form an image in the image sensor 511 is blocked at the opening 52a. The front surface of the second substrate 52 is colored black or treated in another manner to prevent light reflection.

The imaging device may eliminate the second substrate 52 and include the first substrate 51 alone. The imaging device may further include, in addition to the second substrate 52, a substrate on which an electronic component is mounted.

Flexible Substrate 53

The first substrate 51 and the second substrate 52 are electrically connected with each other with a flexible substrate 53. The flexible substrate 53 is flexible and electrically connects the first substrate 51 with the second substrate 52.

Shield Plate 6

The shield plate 6 is a plate of, for example, conductive metal. The shield plate 6 is located rearward from the first substrate 51 in the optical axis direction. In other words, the shield plate 6 is placed between the first substrate 51 and the rear case 7. The shield plate 6 may be electrically connected to a ground potential. For example, a leaf spring unit on the shield plate 6 may be in contact with a pattern of the first substrate 51 or the second substrate 52 with a ground potential, causing the entire shield plate 6 to have a ground potential. The shield plate 6 is joined to the rear case 7 and fixed with multiple fasteners 83. The shield plate 6 may be placed near any component that is likely to generate electromagnetic noise, such as the first substrate 51, other than between the first substrate 51 and the rear case 7.

Location of Waterproof Seal 4

Figure 7:
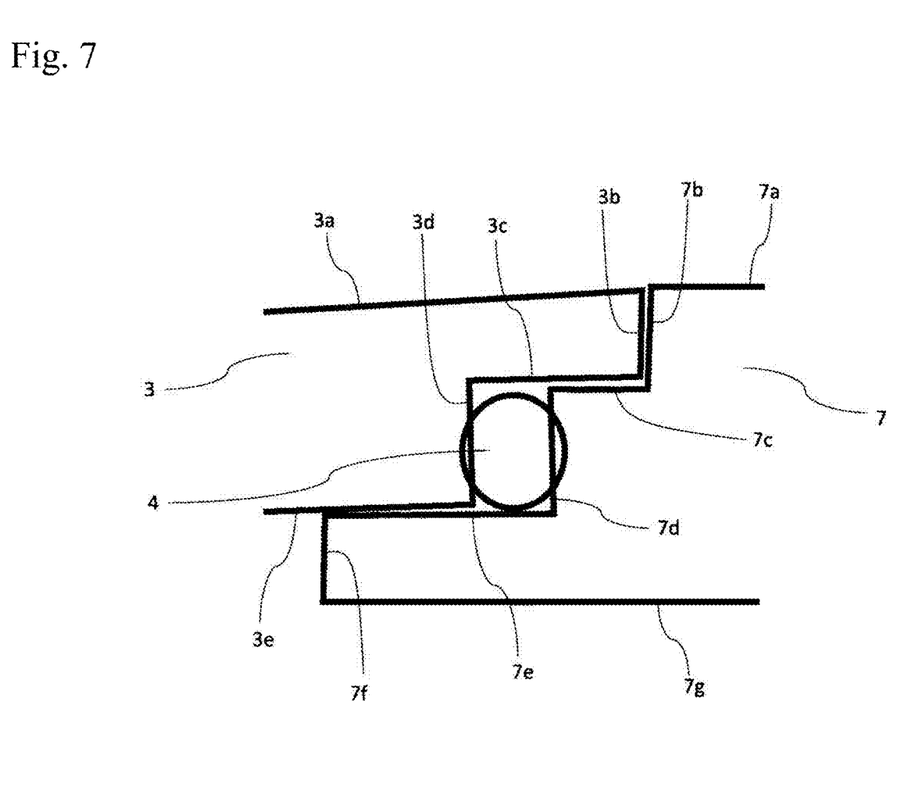
FIG. 7 is an enlarged cross-sectional view of a portion near a waterproof seal.

FIG. 7 is a cross-sectional view of a portion near the waterproof seal 4. FIG. 7 shows the waterproof seal 4, a portion of the front case 3, and a portion of the rear case 7. As shown in FIG. 7, the front case 3 has an outer surface 3a and an inner surface 3e. The front case 3 has surfaces 3b and 3d perpendicular to the optical axis and a surface 3c parallel to the optical axis. In other words, the front case 3 has two steps on the rear surface. The rear case 7 has an outer surface 7a and an inner surface 7g. The rear case 7 has surfaces 7b, 7d, and 7f perpendicular to the optical axis and surfaces 7c and 7e parallel to the optical axis. In other words, the rear case 7 has three steps on the front surface. The surfaces 3b and 3d of the front case 3 respectively face the surfaces 7b and 7d of the rear case 7. The surface 7f of the rear case 7 does not face any portion of the front case 3.

The waterproof seal 4 is held in the waterproof-seal holding space defined by the surfaces 3c and 3d of the front case 3 and the surfaces 7d and 7e of the rear case 7. The waterproof seal 4 is held while being pressed in the optical axis direction by the surfaces 3d and 7d. The waterproof seal 4 may be held while being pressed perpendicularly to the optical axis by the surfaces 3c and 7e.

The inner surface 3e of the front case 3 extends frontward from the inward edge of the surface 3d forming the waterproof-seal holding space. As shown in FIG. 6, the inner surface 3e faces the edges of the first substrate 51 and the second substrate 52. In other words, the first substrate 51 and the second substrate 52 both have their edges facing the inner surface 3e.

Although the front case 3 in a known imaging device has a portion facing the surface 7f of the rear case 7, the front case 3 in the structure according to the present embodiment has no such portion. The front case 3 with no such portion can have a larger internal space than in known structures.

2. MODIFICATIONS

Figure 8:
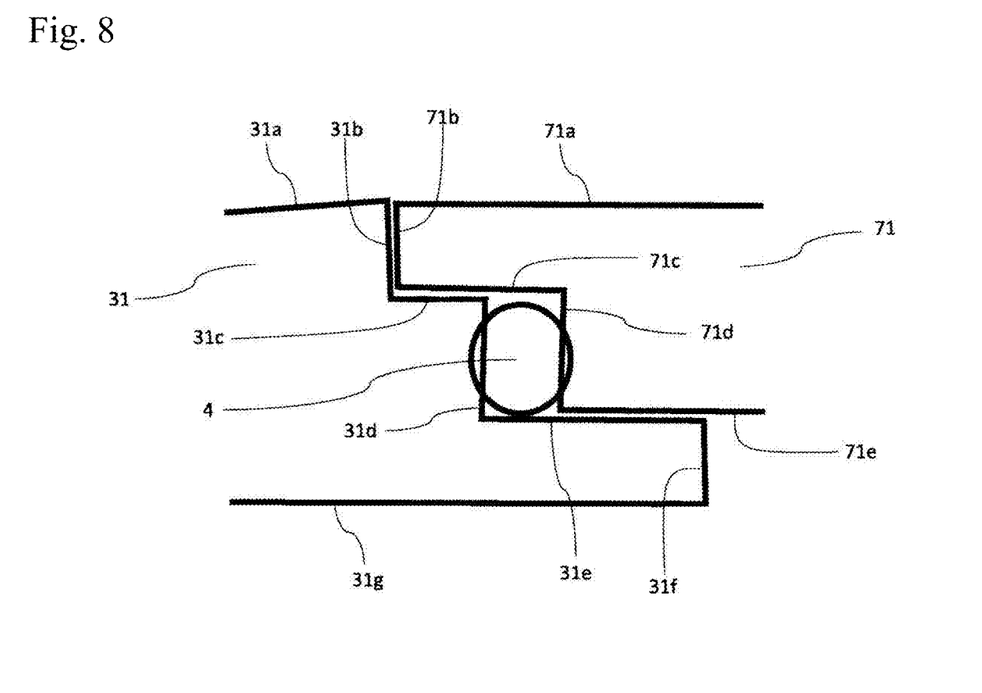
FIG. 8 is an enlarged cross-sectional view of a portion near a waterproof seal according to a modification.

Modifications of the above embodiment will now be described. The structure according to the present modification is the same as in the above embodiment except that a front case 31 and a rear case 71 include portions near a waterproof seal 4 shaped differently from those in the embodiment. The modification will be described focusing on its differences from the above embodiment, and the same or corresponding components as in the above embodiment will not be described.

FIG. 8 is a cross-sectional view of a portion near the waterproof seal 4. FIG. 8 shows the waterproof seal 4, a portion of the front case 31, and a portion of the rear case 71. As shown in FIG. 8, the front case 31 has an outer surface 31a and an inner surface 31g. The front case 31 has surfaces 31b, 31d, and 31f perpendicular to the optical axis and surfaces 31c and 31e parallel to the optical axis. In other word, the front case 31 has three steps on the rear surface. The rear case 71 has an outer surface 71a and an inner surface 71e. The rear case 71 has surfaces 71b and 71d perpendicular to the optical axis and a surface 71c parallel to the optical axis. In other word, the rear case 71 has two steps on the front surface. The surfaces 31b and 31d of the front case 31 respectively face the surfaces 71b and 71d of the rear case 71. The surface 31f of the front case 31 does not face any portion of the rear case 71.

The waterproof seal 4 is held in the waterproof-seal holding space defined by the surfaces 31d and 31e of the front case 31 and the surfaces 71c and 71d of the rear case 71. The waterproof seal 4 is held while being pressed in the optical axis direction by the surfaces 31d and 71d. The waterproof seal 4 may be held while being pressed perpendicularly to the optical axis by the surfaces 31e and 71c.

The inner surface 71e of the rear case 71 extends rearward from the inward edge of the surface 71d forming the waterproof-seal holding space. In the structure according to the present modification, the waterproof-seal holding space is located frontward from the first substrate 51 and the second substrate 52, and the inner surface 71e of the rear case 71 faces the edges of the first substrate 51 and the second substrate 52. In other words, the first substrate 51 and the second substrate 52 both have their edges facing the inner surface 71e.

The structure according to the present modification provides a larger space in the rear case 71 for accommodating the first substrate 51 and the second substrate 52, unlike the structure according to the above embodiment providing a larger space in the front case 3. This structure provides a larger space for accommodating the first substrate 51 and the second substrate 52 as in the embodiment.

Figure 9:
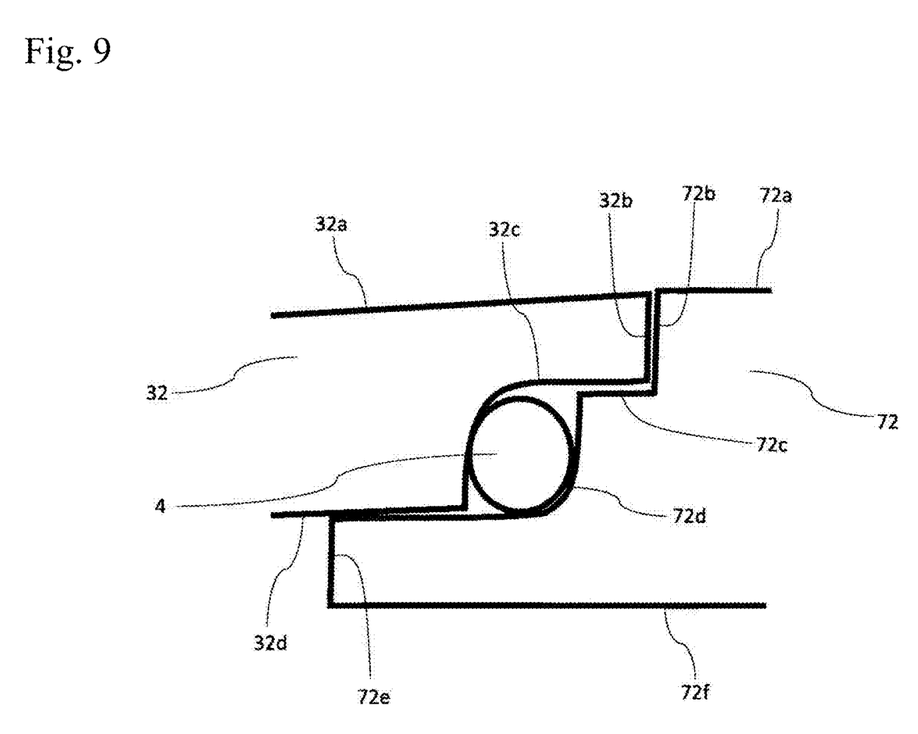
FIG. 9 is an enlarged cross-sectional view of a portion near a waterproof seal according to a modification.

Another modification of the embodiment will now be described. The structure according to the present modification is the same as in the above embodiment except that a front case 32 and a rear case 72 include portions near a waterproof seal 4 shaped differently from those in the embodiment. The modification will be described focusing on its differences from the above embodiment, and the same or corresponding components as in the above embodiment will not be described.

FIG. 9 is a cross-sectional view of a portion near the waterproof seal 4. FIG. 9 shows the waterproof seal 4, a portion of the front case 32, and a portion of the rear case 72. As shown in FIG. 9, the front case 32 has an outer surface 32a and an inner surface 32d. The front case 32 has a surface 32b perpendicular to the optical axis and a curved surface 32c. The curved surface 32c includes a portion perpendicular to the optical axis and a portion parallel to the optical axis. The rear case 72 has an outer surface 72a and an inner surface 72f. The rear case 72 has a surface 72b perpendicular to the optical axis, a surface 72c parallel to the optical axis, and a curved surface 72d. The curved surface 72d includes a portion perpendicular to the optical axis and a portion parallel to the optical axis. The surface 32b of the front case 32 faces the surface 72b of the rear case 72. The surface 72e of the rear case 72 does not face any portion of the front case 32.

In other words, the curved surface 32c replaces the surfaces 3c and 3d of the front case 3 in the above embodiment, and the curved surface 72d replaces the surfaces 7d and 7e of the rear case 7 in the above embodiment.

The waterproof seal 4 is held in the waterproof-seal holding space defined by the curved surface 32c of the front case 32 and the curved surface 72d of the rear case 72. The waterproof seal 4 is held while being pressed by the curved surfaces 32c and 72d.

In the structure according to the present modification, the waterproof-seal holding space is defined by the curved surfaces 32c and 72d. This structure also provides a larger internal space in the front case 32 as in the embodiment.

3. FEATURES

The structures according to the embodiment and the modifications of the present invention specifically described above have the features described below.

The imaging device according to one or more embodiments of the present invention includes the front case 3 or the rear case 71 (first case) that has the surface (3d or 71d) perpendicular to the optical axis, the surface (3c or 71c) parallel to the optical axis, and the inner surface (3e or 71e). The rear case 7 or the front case 31 (second case) has the surface (7d or 31d) perpendicular to the optical axis and the surface (7e or 31e) parallel to the optical axis. The waterproof seal 4 is held in the waterproof-seal holding space defined by these surfaces. The front case 3 or the rear case 71 has the inner surface (3e or 71e) meeting the surface (3d or 71d) perpendicular to the optical axis and extending in the optical axis direction. The inner surface faces the edges of the first substrate 51 and the second substrate 52.

In this structure, the case (the front case 3 or the rear case 71) has the inner surface, facing the substrates (the first substrate 51 and the second substrate 52), located more outward than in known structures. Thus, the case having the same size as in known structures can provide a relatively large space for accommodating the substrates. The imaging device including the substrates having the same size as in known structures can be relatively small.

In one modification of the present invention, the front case 32 (or the rear case) has the curved surface 32c including the portion perpendicular to the optical axis, and the rear case 72 (or the front case) has the curved surface 72d including the portion perpendicular to the optical axis. The curved surfaces 32c and 72d define the waterproof-seal holding space. This structure also provides a relatively large space for accommodating the substrates as in the structures described above.

In the imaging device according to one or more embodiments of the present invention, the front case 3 has a relatively large internal space for accommodating the substrates. In the imaging device according to one modification, the rear case 71 has a relatively large internal space for accommodating the substrates.

The imaging device according to one or more embodiments of the present invention may simply include the first substrate 51 on which the image sensor 511 is mounted or may include more substrates including the second substrate 52. In such structures, at least one substrate has its edge facing the inner surface of the front case or the rear case to provide a relatively large space for accommodating the at least one substrate. The imaging device can thus be relatively small.

4. SUPPLEMENTAL EXAMPLES

The embodiments and the features of the present invention are described above by way of example. The scope of the present invention is not limited to the above embodiments but is construed broadly within the scope understandable by those skilled in the art in accordance with the above embodiments.

For example, although the surfaces of the front case and the rear case are perpendicular or parallel to the optical axis in the embodiments, the surfaces may form an angle with the optical axis, rather than precisely perpendicular or parallel to the optical axis. Forming an angle of less than 45° with a plane perpendicular to the optical axis may herein be referred to as being substantially perpendicular to the optical axis. Forming an angle of less than 45° with a plane parallel to the optical axis may herein be referred to as being substantially parallel to the optical axis.

The imaging device according to one or more embodiments includes two rigid substrates, or specifically the first substrate 51 and the second substrate 52. However, the imaging device may further include an additional rigid substrate. The second substrate 52 may be located in any manner, rather than being along a plane perpendicular to the optical axis. The second substrate 52 may be located rearward from the first substrate 51 in the optical axis direction. The first substrate 51 and the second substrate 52 may be flexible substrates, rather than rigid substrates.

INDUSTRIAL APPLICABILITY

The imaging device according to one or more embodiments of the present invention may be suitably used for in-vehicle imaging devices.

The invention claimed is:

1. An imaging device, comprising:
a first case;
a second case joined to the first case;
a substrate on which an electronic component is mounted, the substrate being accommodated in an internal space defined by the first case and the second case;
a lens barrel holding a lens and supported by the first case or the second case; and
a waterproof seal held in a waterproof-seal holding space between the first case and the second case,
wherein the first case has a first surface substantially perpendicular to an optical axis, a second surface substantially parallel to the optical axis, and an inner surface meeting the first surface and extending in a direction of the optical axis, the first surface and the second surface form the waterproof-seal holding space, and the inner surface faces an edge of the substrate, and
the second case has a third surface substantially perpendicular to the optical axis and a fourth surface substantially parallel to the optical axis, a fifth surface substantially parallel to the optical axis, a sixth surface substantially perpendicular to the optical axis, the third surface and the fourth surface form the waterproof-seal holding space, the third surface meets the fourth surface and the fifth surface, and the fifth surface meets the sixth surface and the third surface.

2. The imaging device according to claim 1, wherein the first case is located frontward from the second case in the optical axis direction, and
the lens barrel is supported by the first case.

3. The imaging device according to claim 1, wherein the first case is located rearward from the second case in the optical axis direction, and
the lens barrel is supported by the second case.

4. The imaging device according to claim 1, wherein the substrate receives an image sensor.

5. The imaging device according to claim 1, further comprising:
an image sensor substrate on which an image sensor is mounted, the image sensor substrate being accommodated in the internal space.

6. The imaging device according to claim 5, wherein the inner surface faces an edge of the image sensor substrate.

7. The imaging device according to claim 1, wherein the sixth surface is farther from the substrate than the third surface.

8. The imaging device according to claim 1, wherein a portion of the second surface extending over the fifth surface is outside of the waterproof-seal holding area.

9. The imaging device according to claim 1, wherein a length of the second surface, in the direction substantially parallel to the optical axis, is greater than a length of the fifth surface, in the direction substantially parallel to the optical axis.

10. The imaging device according to claim 1, wherein a first total thickness of the first case at the waterproof-sealing holding area is less than a second total thickness of the second case at the waterproof-seal holding area.

11. The imaging device according to claim 1, wherein the first case further includes a seventh surface substantially perpendicular to the optical axis, the second surface meets the first surface and the seventh surface.

12. The imaging device according to claim 11, wherein the seventh surface faces the sixth surface.

13. The imaging device according to claim 1, wherein the second case further includes an eighth surface substantially parallel to the optical axis, and the sixth surface meets the fifth surface and the eighth surface.

14. An imaging device, comprising:
a first case;
a second case joined to the first case;
a substrate on which an electronic component is mounted, the substrate being accommodated in an internal space defined by the first case and the second case;
a lens barrel holding a lens and supported by the first case or the second case; and
a waterproof seal held in a waterproof-seal holding space between the first case and the second case,
wherein the first case has a first surface including a portion substantially perpendicular to an optical axis and an inner surface extending in a direction of the optical axis from the first surface, a second surface substantially parallel to the optical axis, the first surface and the second surface form the waterproof-seal holding space, and the inner surface faces an edge of the substrate, and
the second case has a third surface including a portion substantially perpendicular to the optical axis and a fourth surface substantially parallel to the optical axis, a fifth surface substantially parallel to the optical axis, a sixth surface substantially perpendicular to the optical axis, the third surface and the fourth surface form the waterproof-seal holding space, the third surface meets the fourth surface and the fifth surface, and the fifth surface meets the sixth surface and the third surface.

15. The imaging device according to claim 14, wherein the sixth surface is farther from the substrate than the third surface.

16. The imaging device according to claim 14, wherein a portion of the second surface extending over the fifth surface is outside of the waterproof-seal holding area.

17. The imaging device according to claim 14, wherein a first total thickness of the first case at the waterproof-sealing holding area is less than a second total thickness of the second case at the waterproof-seal holding area.

18. The imaging device according to claim 14, wherein the first case further includes a seventh surface substantially perpendicular to the optical axis, the second surface meets the first surface and the seventh surface, and the seventh surface faces the sixth surface.

19. The imaging device according to claim 14, wherein the second case further includes an eighth surface substantially parallel to the optical axis, and the sixth surface meets the fifth surface and the eighth surface.

20. An imaging device, comprising:
   a first case;
   a second case joined to the first case;
   a substrate on which an electronic component is mounted, the substrate being accommodated in an internal space defined by the first case and the second case;
   a lens barrel holding a lens and supported by the first case or the second case; and
   a waterproof seal held in a waterproof-seal holding space between the first case and the second case,
   wherein the first case has a first surface substantially perpendicular to an optical axis, a second surface substantially parallel to the optical axis, and an inner surface meeting the first surface and extending in a direction of the optical axis, the first surface and the second surface form the waterproof-seal holding space, the inner surface faces an edge of the substrate, the first case has a first total thickness at the waterproof-seal holding space, and
   the second case has a third surface substantially perpendicular to the optical axis and a fourth surface substantially parallel to the optical axis, the third surface and the fourth surface form the waterproof-seal holding space, the second case has a second total thickness at the waterproof-seal holding space, and the second total thickness is greater than the first total thickness.

* * * * *